(12) United States Patent
Kurani et al.

(10) Patent No.: US 10,771,251 B1
(45) Date of Patent: *Sep. 8, 2020

(54) IDENTITY MANAGEMENT SERVICE VIA VIRTUAL PASSPORT

(71) Applicant: Wells Fargo Bank, N.A., San Francisco, CA (US)

(72) Inventors: Ashish B. Kurani, Hillsborough, CA (US); Wayne Barakat, Novato, CA (US); Martin Barrs, San Francisco, CA (US); Dominik Vltavsky, Belmont, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/412,089

(22) Filed: May 14, 2019

Related U.S. Application Data

(63) Continuation of application No. 14/937,210, filed on Nov. 10, 2015, now Pat. No. 10,298,396.

(51) Int. Cl.
  *H04L 29/06* (2006.01)
  *H04L 9/32* (2006.01)
  *G06F 21/31* (2013.01)
  *G06F 21/32* (2013.01)

(52) U.S. Cl.
  CPC ............ *H04L 9/3226* (2013.01); *G06F 21/31* (2013.01); *G06F 21/32* (2013.01); *H04L 9/3231* (2013.01); *H04L 63/08* (2013.01); *H04L 63/083* (2013.01); *H04L 63/0861* (2013.01)

(58) Field of Classification Search
  CPC ..... H04L 9/3226; H04L 63/08; H04L 63/083; H04L 63/0861; G06F 21/31
  See application file for complete search history.

(56) References Cited

U.S. PATENT DOCUMENTS

| 5,787,186 A | 7/1998 | Schroeder |
| 6,005,939 A | 12/1999 | Fortenberry et al. |
| 10,298,396 B1 * | 5/2019 | Kurani .................. G06F 21/33 |
| 2002/0091646 A1 | 7/2002 | Lake et al. |

(Continued)

FOREIGN PATENT DOCUMENTS

WO  WO-2016/204461  12/2016

OTHER PUBLICATIONS

"Stampery Now Lets You Certify Documents Using the Blockchain and Your Real Identity", http://techcrunch.com/2015/11/20/stampery-now-lets-you-certify-documents-using-the-blockchain-and-your-real-identity/, posted by Romain Dillet on Nov. 20, 2015.

(Continued)

*Primary Examiner* — Mohammad A Siddiqi
(74) *Attorney, Agent, or Firm* — Foley & Lardner LLP

(57) ABSTRACT

A method includes verifying the identity of an individual. A virtual passport for the individual is created upon verifying the identity of the individual. The virtual passport uniquely identifies the individual. A public/private key pair associated with the individual is generated. The virtual passport is signed with the private key. The signed virtual passport is entered in a public block chain. The signed virtual passport may be retrieved from the public block chain. The authenticity of the signed virtual passport may be determined via the public key.

28 Claims, 5 Drawing Sheets

(56) References Cited

U.S. PATENT DOCUMENTS

| | | |
|---|---|---|
| 2002/0144109 A1* | 10/2002 | Benantar ................ H04L 9/006 |
| | | 713/156 |
| 2003/0172296 A1 | 9/2003 | Gunter |
| 2004/0181675 A1 | 9/2004 | Hansen |
| 2005/0015587 A1 | 1/2005 | Stransky |
| 2005/0154877 A1 | 7/2005 | Trench |
| 2005/0188212 A1 | 8/2005 | Laferriere et al. |
| 2006/0133615 A1 | 6/2006 | Bade et al. |
| 2008/0048022 A1 | 2/2008 | Vawter |
| 2009/0254968 A1 | 10/2009 | Bussani et al. |
| 2010/0088507 A1 | 4/2010 | Cho |
| 2010/0306816 A1 | 12/2010 | McGrew et al. |
| 2012/0313777 A1 | 12/2012 | Zazula |
| 2012/0323717 A1 | 12/2012 | Kirsch |
| 2014/0162598 A1 | 6/2014 | Villa-Real |
| 2015/0205929 A1 | 7/2015 | Brama |
| 2015/0304847 A1 | 10/2015 | Gong et al. |
| 2015/0310424 A1 | 10/2015 | Myers |
| 2015/0379510 A1 | 12/2015 | Smith |
| 2016/0330027 A1* | 11/2016 | Ebrahimi ................ H04L 9/302 |

OTHER PUBLICATIONS

Andrew Austin, "E-commerce—is your bank adding value?", treasurers.org; Jun. 2000 pp. 47-49.
Bio-ID: Biologically Inspired Identification and Recognition System EO Nwoye, JE Muoneke; International Journal of Computer and Information Technology (ISSN: 2279-0764; vol. 02—Issue 02, Mar. 2013; pp. 314-318.

\* cited by examiner

IDENTITY MANAGEMENT SERVICE VIA VIRTUAL PASSPORT

CROSS-REFERENCE TO RELATED PATENT APPLICATIONS

This application is a continuation of U.S. patent application Ser. No. 14/937,210, filed on Nov. 10, 2015, entitled "IDENTITY MANAGEMENT SERVICE VIA VIRTUAL PASSPORT", which is incorporated herein by reference in its entirety.

BACKGROUND

Identity verification is necessary to ensure that an individual is who he or she purports to be. For example, merchants may require that a customer shows his or her driver's license to verify that a payment card being used for a transaction belongs to the customer. In another example, an airport may require a customer to show his or her passport or driver's license to verify that the user's plane ticket is assigned to the individual attempting to use the ticket. In financial industries, identity verification is often required by "know your customer" (KYC) or "customer identification program" (CIP) regulations. KYC and CIP programs are implemented to prevent identity theft, financial fraud, money laundering and terrorist financing.

SUMMARY

According to one example embodiment, a computer-implemented method performed by an identity verification computing system includes verifying the identity of an individual. A virtual passport for the individual is created upon verifying the identity of the individual. The virtual passport uniquely identifies the individual. A public/private key pair associated with the individual is generated. The virtual passport is signed with the private key. The signed virtual passport is entered in a public block chain. The signed virtual passport may be retrieved from the public block chain. The authenticity of the signed virtual passport may be determined via the public key.

According to another example embodiment, a system includes personal identifying information associated with an individual of the system. The system also includes a server system. The server system includes a processor and instructions stored in non-transitory machine-readable media. The instructions configured to cause the server system to verify the identity of the individual using the personal identifying information associated with the individual. A virtual passport is created for the individual based on the personal identifying information. The virtual passport uniquely identifies the individual. A public/private key pair associated with the individual is generated. The virtual passport is signed with the private key. The signed virtual passport entry is entered in a public block chain. The signed virtual passport may be retrieved from the public block chain. The authenticity of the signed virtual passport may be determined via the public key.

According to another example embodiment, a system includes a network interface configured to communicate with an entity computing system via a network. An identity database stores verified personal identifying information relating to an individual. The system also includes a memory and at least one processor configured to verify the identity of the individual using the personal identifying information associated with the individual. A virtual passport for an individual is created based on the personal identifying information. The virtual passport uniquely identifies the individual. A public/private key pair associated with the individual is generated. The virtual passport is signed with the private key. The signed virtual passport is entered in a public block chain. The signed virtual passport may be retrieved from the public block chain. The authenticity of the signed virtual passport may be determined via the public key.

According to another example embodiment, a computer-implemented method performed by an entity computing system includes receiving a public key from an individual. The public key is part of a public/private key pair generated by an identity verification computing system in connection with creating a virtual passport for the individual. The virtual passport is retrieved from a public block chain via the public key. The virtual passport has been signed by the private key of the public/private key pair. The authenticity of the signed virtual passport is verified using the public key. The identity of the individual is verified if the signed virtual passport is authentic, based on content of the virtual passport.

BRIEF DESCRIPTION OF THE FIGURES

The details of one or more implementations are set forth in the accompanying drawings and the description below. Other features, aspects, and advantages of the disclosure will become apparent from the description, the drawings, and the claims.

DETAILED DESCRIPTION

Figure 1:
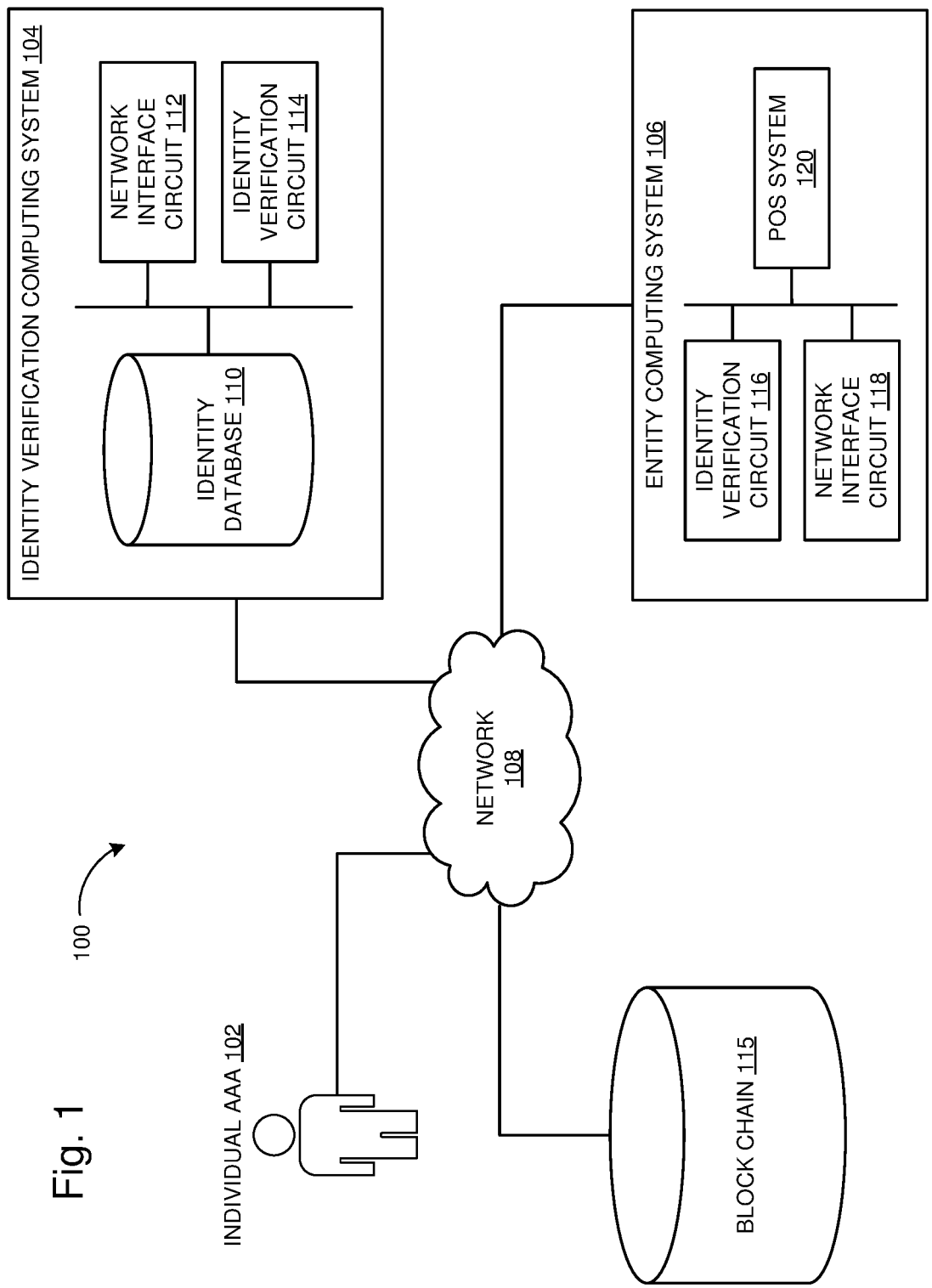
FIG. 1 is a block diagram of a data processing system, according to an embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Certain companies, organizations, or other entities may be better situated than others to verify the identities of individuals. For example, financial institutions (FIs), which have access to substantial identifying information for their customers and who regularly monitor for identity theft, may be particularly well-suited and trusted to perform accurate identity verification. Accordingly, other entities (e.g., merchants) may rely on the fact that a trusted party (e.g., an FI) has verified an individual's identity rather than solely engaging in their own identity verification efforts. In some cases, an entity (e.g., a merchant) may choose to accept identity verification only from certain identity verification computing systems. For example, a merchant may trust identity verification performed by a major U.S. bank, but may not trust purported identity verification performed by a small bank in a third-world country.

Referring generally to the figures, systems and methods for identity verification via a virtual passport are shown. According to various embodiments, an open architecture identity verification system may include multiple identity verification computing systems (e.g., associated with different FIs or other identity verification entities). An identity verification computing system may verify the identity of an individual and create a virtual passport for the individual. The virtual passport includes an individualized (e.g., customer-specific) digital signature that is easy to verify by the identity verification computing system, but is also very difficult to reproduce by fraudsters. A public key/private key pair is generated upon creating the virtual passport. The virtual passport is signed with the private key, and the signed virtual passport is stored in a public block chain such that any entity receiving the public key tied to the virtual passport can retrieve the individual's signed virtual passport to verify the identity of the individual. The virtual passport may be used, for example, to verify an individual's identity to entities (e.g., merchants, currency exchanges, etc.), to objects (e.g., ATMs), to other individuals, etc. The virtual passport may include identification of the particular identity verification computing system that generated the virtual passport. To that end, entities may choose to rely on virtual passports, and therefore identity verification, performed by only certain trusted identity verification computing systems.

The open architecture, block chain-based identity verification system solves technical problems associated with conventional identity verification systems. Conventionally, individual identity verification entities individually manage and store identity information for individuals. The open architecture structure enables multiple different identity verification entities to store identity related information on the block chain. Other entities (e.g., merchants) can retrieve the identity related information from the block chain. Accordingly, the present system enables entities (e.g., merchants) to rely on identity verification performed by trusted identity verification entities rather than engaging in their own identity verification efforts. Further, in conventional identity verification systems, each identity verification entity is vulnerable to hackers that attempt to steal, change, or corrupt individuals' identity information. By storing virtual passports on a block chain, no single entity holds all of the data. Instead, the data is distributed and maintained globally by many entities via the block chain. As will be appreciated, the block chain architecture and proof of work requirement protects the data against hacking or revision.

Each identity verification entity is vulnerable to hackers that attempt to steal, change, or corrupt individuals' identity information. By storing virtual passports on a block chain, no single entity holds all of the data. Instead, the data is distributed and maintained globally by many entities via the block chain. As will be appreciated, the block chain architecture and proof of work requirement protects the data against hacking or revision.

An example embodiment operates as follows. An individual provides his or her public key to an entity computing system. The entity computing system may use the individual's public key to look up and retrieve the individual's virtual passport record from the block chain. The virtual passport may be encrypted or unencrypted. In some embodiments, a digital signature scheme is implemented using the public/private key pair, such that the entity computing system can utilize the public key to verify that the particular identity verification computing system signed the individual's virtual passport, thereby signifying that the particular identity verification computing system has verified the individual's identity.

In other embodiments, the entity computing system, upon retrieving the virtual passport from the block chain, may transmit an identity verification request to the particular identity verification computing system. The identity verification request may include or identify the virtual passport retrieved from the block chain. In some embodiments, the virtual passport may include a particular verification code, identifier, or signature generated by the identity verification computing system. The identity verification computing system may verify that the identity verification computing system in fact generated the particular verification code in connection with creating the individual's virtual passport, and may return an identity verification message to the entity.

In further embodiments, the identity verification computing system may contact the individual to verify that the individual approves the entity's request to verify the individual's identity. Upon receiving approval from the individual, the identity verification computing system may return an identity verification message to the entity.

FIG. 1 is a block diagram of a data processing system 100, according to an embodiment. The data processing system 100 includes an individual 102, an identity verification computing system 104, and an entity computing system 106. The individual 102, the identity verification computing system 104, and the entity computing system 106 may communicate directly or through a network 108, which may include one or more of the Internet, cellular network, Wi-Fi, Wi-Max, a proprietary banking network, or any other type of wired or wireless network.

The identity verification computing system 104 and the entity computing system 106 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein. The identity verification computing system 104 and the entity computing system 106 may each include server-based computing systems, for example, comprising one or more networked computer servers that are programmed to perform the operations described herein. The identity verification computing system 104 and the entity computing system 106 may each be implemented as distributed computer systems where each function is spread over multiple computer systems.

The identity verification computing system 104 is managed by a third-party service provider to provide identity verification services to various entities. For example, the entity computing system 106 may utilize the identity verification computing system 104 to verify that the individual 102 is who he or she purports to be. They entity computing system 106 may wish to verify the identity of the individual 102 for any of various reasons, such as to prevent payment (e.g., credit card) fraud, banking fraud, identity fraud, illegal activity (e.g., harassment, scams, money laundering, etc.), sockpuppetry, underage signups, spamming, etc. The identity verification computing system 104 may be a trusted third-party computing system that is configured to verify that the individual 102 is who he or she purports to be. The identity verification computing system 104 may provide identity verification services through an application programming interface (API). Generally, an API is a software-to-software interface that allows computing systems of two different entities to communicate with each other. In this instance, the API of the identity verification computing system 104 may be used by the entity computing system 106 and other entities to verify the identities of individuals. The identity verification computing system 104 may distribute a software development kit (SDK) to allow the customers to better integrate the API into their websites and applications. Some embodiments may include multiple identity verification computing systems.

According to various embodiments, the identity verification computing system 104 may be managed by an FI, a governmental institution, a credit bureau, a dedicated identity verification service provider, or another type of business or entity. For example, the identity verification computing system 104 may be managed by an FI that provides banking services (e.g., deposit account services, credit account services, brokerage account services, etc.) to individuals and entities, such as the individual 102. In the instance in which the individual 102 is a current account holder, the identity verification computing system 104 (e.g., FI) already has a significant amount of information regarding the individual's identity, which has been collected through the onboarding process for opening an account with the FI. During the initial onboarding process used by the FI to verify the individual 102 before permitting the individual 102 to become an account holder, the individual 102 may provide certain personal information, such as legal name, address, contact information, driver's license number, tax identification number, social security number, and the like. The personal information provided during the onboarding process was previously verified prior to permitting the individual 102 to open an account with the FI. Such information may be provided in connection with KYC and/or CIP regulations.

The identity verification computing system 104 includes an identity database 110, a network interface circuit 112, and an identity verification circuit 114. The identity database 110 stores information relating to the identities of individuals, customers, users, account holders, etc. The identity database 110 may also store information relating to the identity service.

The network interface circuit 112 facilitates data communications to and from the identity verification computing system 104. The network interface circuit 112 includes hardware (e.g., Ethernet controller, memory, etc.) and software necessary to facilitate data communications for the identity verification computing system 104 over the network 108.

The identity verification circuit 114 is structured to generate and manage virtual passports for individuals, and to verify the identity of individuals. For example, the identity verification circuit 114 may generate a virtual passport record for the individual 102, based on various types of personal identifying information, as described above. A public/private key pair is also generated for the individual. The private key is used to sign virtual passport record of the individual 102, and the signed virtual passport record is stored in a block chain 115 that is accessible by the general public. The private key associated with the individual 102 is stored in the secure identity database 110.

According to various embodiments, the data processing system 100 may include multiple identity verification computing systems 104 and multiple entity computing systems 106. Each of the identity verification computing systems 104 may store virtual passports or other identifying information in the block chain 115, and any of the entity computing systems 106 may retrieve virtual passports from the block chain 115. By using a publicly accessible block chain 115, the virtual passport information is maintained in a distributed ledger that is accessible by anyone, anywhere.

The block chain 115 is a distributed database or public ledger of all virtual passport or identity information that has been stored in the block chain 115 since its genesis. The block chain 115 may be similar to other block chains, such as those used for math-based currencies (e.g., Bitcoin), or may be built on top of a math-based currency block chain. The block chain 115 hashes transactions (e.g., virtual passports) into an ongoing chain of hash-based proof-of-work, forming a record that cannot be changed without redoing the proof-of-work. The longest chain not only serves as proof of the sequence of events witnessed, but proof that it came from the largest pool of CPU power (e.g., operated by miners). The proof-of-work requirement ensures that entries in the block chain are not compromised. In some embodiments, miners are paid for their mining activities via minimal transaction fees.

In some embodiments, the results of identity verification requests may be entered into the block chain 115. Results of identity verification requests may be considered in evaluating the identity of an individual. For example, if an individual has had several negative identity verification requests, the individual's identity may be more likely to have been compromised by a fraudster.

The entity computing system 106 may request identity verification for various individuals (e.g., customers). According to various embodiments, the entity computing system 106 may be managed by an entity, such as a merchant, an ATM, another individual, a website (e.g., social networking website, dating website, wiki, etc.), a service provider, or any other type of entity that wishes to verify the identity of an individual.

The entity computing system 106 may include a network interface circuit 116, an identity verification circuit 118, and a point-of-sale (POS) system 120. The identity verification circuit 118 is structured to verify the identity of individuals via operative communication with the identity verification circuit 114 of the identity verification computing system 104. For example, the identity verification circuit 118 may be structured to analyze information received from the individual 102 to format and send API calls to the identity verification computing system 104 to verify the identity of individuals. The network interface circuit 116 facilitates data communications to and from the entity computing system 106. The network interface circuit 118 includes hardware (e.g., Ethernet controller, memory, etc.) and software necessary to facilitate data communications for the entity computing system 106 over the network 108.

According to various embodiments, identity verification may be facilitated through the POS system 120 of the entity computing system 106. For example, the POS system 120 may include a cash register system operated by the entity computing system 106. In another embodiment, the POS system 120 may include a backend server system that provides a website (e.g., an online shopping website) and/or a mobile application (e.g., a smartphone application, a tablet application, etc.) associated with the entity computing system 106. Other embodiments may not include a POS system 120. For example, in some embodiments, the entity computing system 106 may be operated by an individual, and identity verification may be facilitated via a device (e.g., smartphone) of an individual rather than the POS system 120.

In some embodiments, identity verification using a virtual passport can be used to authenticate a user at an ATM instead of the ATM operator contracting with a third-party verification service (e.g., Visa/MasterCard). This eliminates the need for the customer to provide a debit or credit card at the ATM. For example, a customer may provide his or her public key to the ATM, rather than a debit or credit card. The ATM may retrieve the customer's virtual passport from the block chain 215. In one example embodiment, the ATM may scan the customer's fingerprint or retina, which may be compared against the virtual passport to verify the identity of the customer. Additionally, the operator of the ATM can have their own passport that is used to verify the identity of the ATM used for the transaction.

Figure 2:
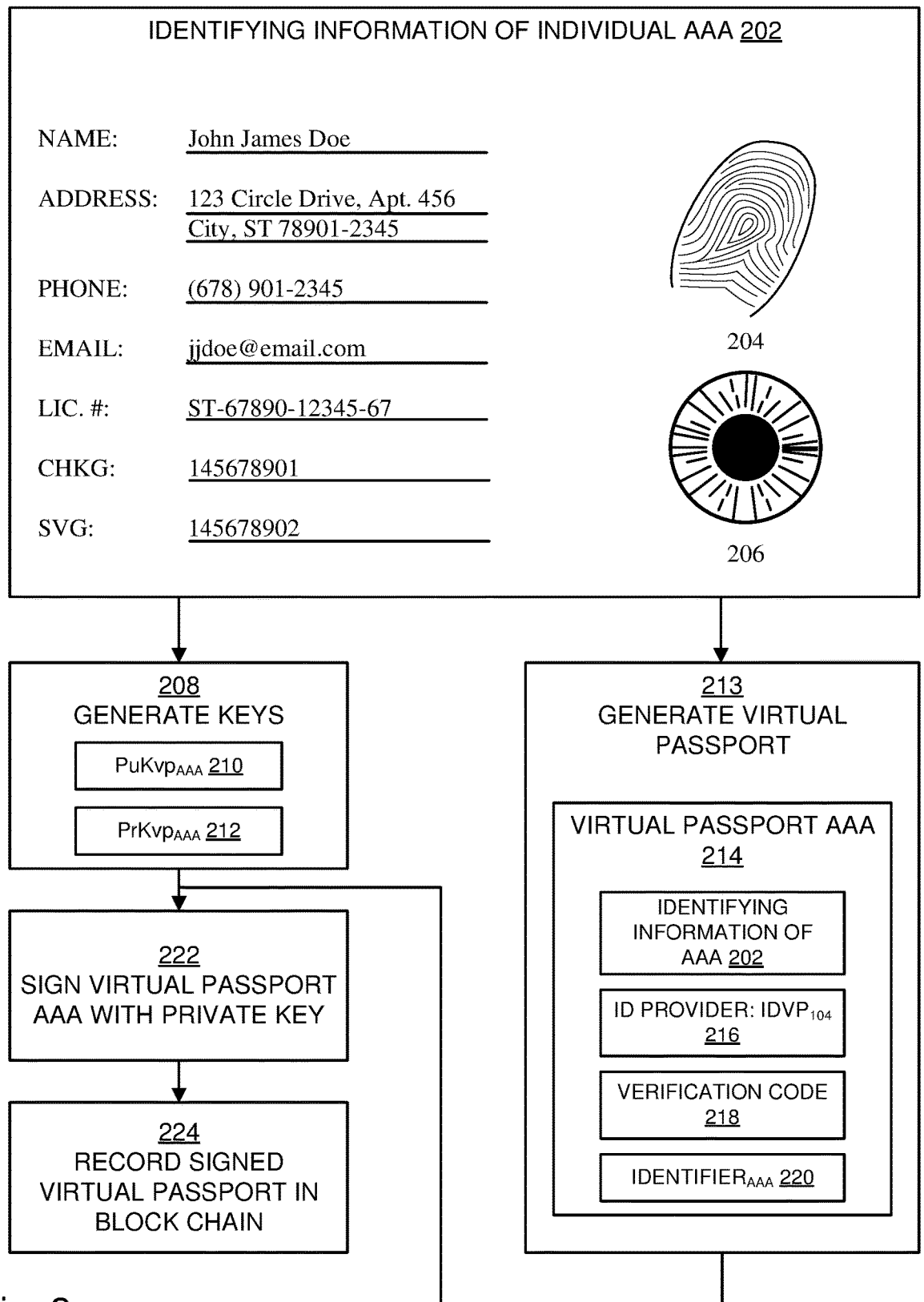
FIG. 2 is a flow diagram illustrating enrollment and creation of a virtual passport.

Turning to FIG. 2, a flow diagram illustrating enrollment and creation of a virtual passport is shown, according to an embodiment. For clarity and brevity, the method 200 is discussed below in connection with the data processing system 100 of FIG. 1. More specifically, the method 200 may be performed by the identity verification computing system 104 of FIG. 1. However, it should be understood that the method 200 may be performed by other systems and devices.

As shown in FIG. 2, various identifying information 202 relating to the individual 102 is received. For example, the identifying information 202 may include the individual's legal name, address, contact information, driver's license number, etc. In the embodiment illustrated in FIG. 2, the identifying information 202 further includes a checking account number and a savings account number. In this instance, the individual 102 may be an existing account holder with an FI that also operates the identity verification computing system 104. The identifying information may also include a biometric, such as a fingerprint 204 or a retinal scan 206 of the individual 102. The identifying information 202 may be collected when the individual 102 enrolls (e.g., opens an account) with the identity verification computing system 104. In some embodiments, the identity verification computing system 104 (e.g., an FI) already includes certain identifying information for the individual 102 (e.g., information collected when opening an account with the FI).

At 208, a public key 210 and a private key 212 are generated for the individual 102. The public key 210 may be transmitted to the individual 102. In one embodiment, the public key 210 is a cryptographic key. For example, in some embodiments, the public and private keys 210, 212 may be used in connection with a digital signatures. For example, the public key 210 may be used to verify the authenticity of data signed with the private key 212. The private key 212 may be used to encrypt and sign data. The private key 212 is retained in the secure identity database 110 of the identity verification computing system 104.

At 213, the identity verification computing system 104 compiles the virtual passport for the individual 102 based on the identifying information 202, and generates a virtual passport 214. The virtual passport 214 may include some or all of the identifying information 202 of the individual 102, an identity provider indicator 216, a verification code 218, and an identifier 220 of the individual 102. The identity provider indicator 216 points to the particular identity verification provider that manages the identity for the individual 102. In this case, the identity provider indicator 216 points to the identity verification computing system 104. The verification code 218 is a unique alphanumeric string generated by the identity verification computing system in connection with creating the virtual passport 214 of the individual 102. Copies of the verification code 218 may be stored in the block chain 115, as well as within the secure identity database 110 of the identity verification computing system 104.

The identifier 220 may include any data (e.g., alphanumeric string or code) that uniquely identifies the individual. In one embodiment, the identifier 220 is generated based on a biometric (e.g., fingerprint or retinal scan) of the individual 102. For example, the biometric may be converted to a string of numbers to generate the identifier 220. In another embodiment, the identifier 220 includes a unique username (e.g., "JohnSmith4527"), customer number, account number, etc. associated with the individual. The identifier 220 may be transmitted to the individual and/or posted in the block chain 115.

At 222, the virtual passport 214 is signed with the private key 212. At 224, the virtual passport 214 is recorded in the block chain 115. The virtual passport 214 may be indexed in the block chain 115 according to the public key 210, the identifier 220, or in other ways. Accordingly, according to various embodiments, the public key 210 and/or the identifier 220 may be used to retrieve all the signed information (e.g., the virtual passport 214) from the public block chain 215. As will be appreciated, the public key 210 or the identifier 220 can be provided by a user via a barcode, NFC, or other ways.

Figure 3A:
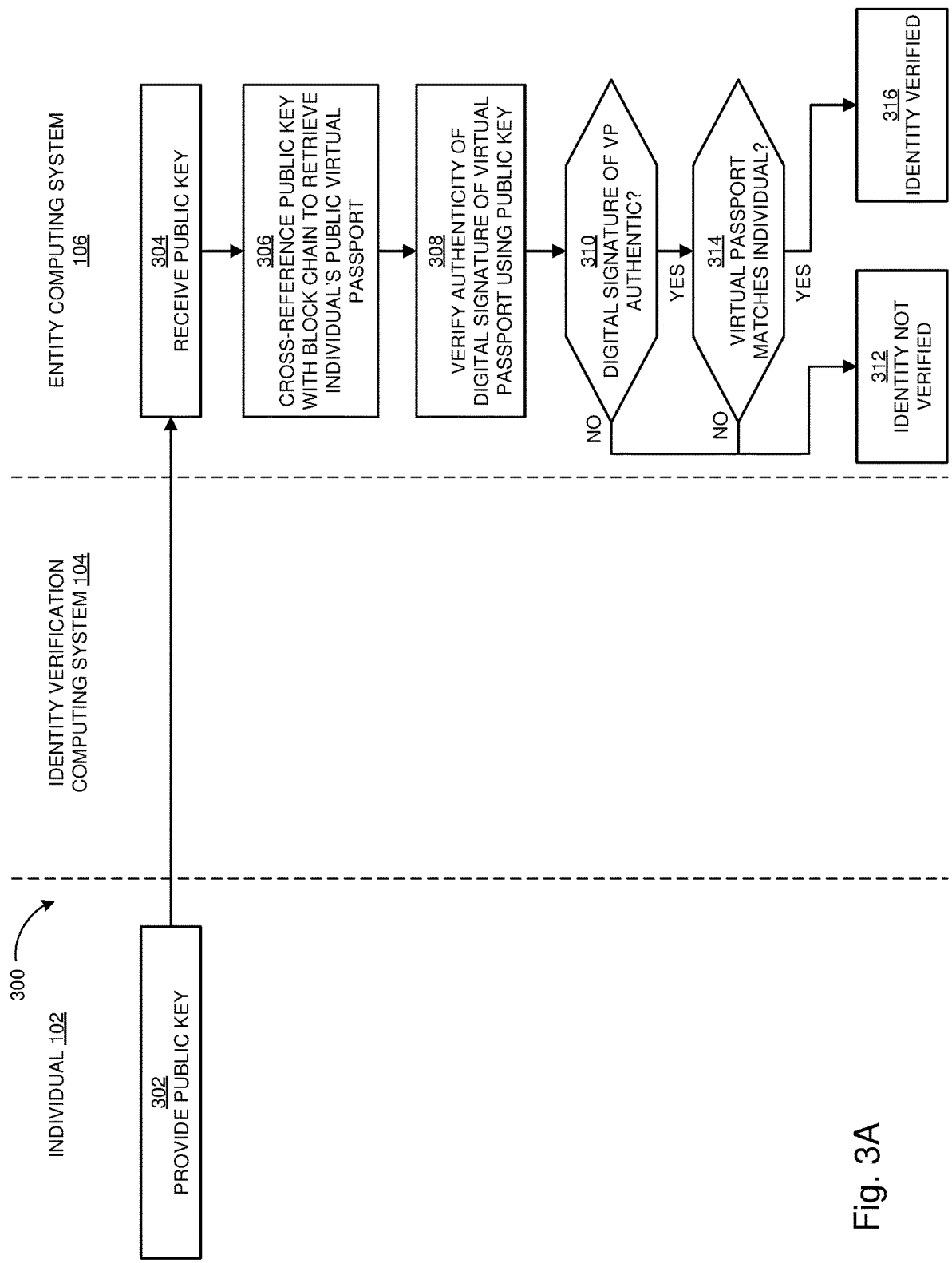
FIGS. 3A-3C are a flow diagram of a method of verifying the identity of an individual using a virtual passport of the individual, according to various embodiments.

Turning to FIG. 3A, a flow diagram of a method 300 of verifying the identity of an individual using a virtual passport of the individual is shown, according to an embodiment. It should be understood that the identity verification computing system 104 has already generated, signed, and stored the virtual passport 214 in the block chain 115 (e.g., as set forth in the method 200 of FIG. 2). In the method 300, the entity computing system 104 retrieves the virtual passport 214 from the block chain 115 and verifies the individual's identity without interacting with the identity verification computing system 104. As will be appreciated, in other embodiments, the entity computing system 104 does interact with the identity verification computing system 104 to verify the identity of the individual 102.

At 302, the individual 102 provides the individual's public key 210 to the entity computing system 106. In other embodiments, the individual 102 may provide the individual's identifier 220 instead of or in addition to the individual's public key 210. The individual 102 can provide the public key 210 and/or the identifier 220 in various ways. For example, the entity computing system 106 may be a merchant and the individual 102 may provide the identifier via a mobile device (e.g., a smartphone or wearable device). For example, the mobile device may display a barcode (e.g., QR code) that is scanned by the POS system 120 of the entity computing system 106. In another example, the identifier may be provided via wireless (e.g., NFC) communication between the individual's mobile device and the POS system 120. In another embodiment, the individual 102 may provide his or her public key 210 and/or identifier 220 via a biometric, such as scanning the individual's fingerprint by the POS system 120. In a further embodiment, the identifier 220 is a username and/or password of the individual 102 that is provided to the entity computing system 106 via a website. In another embodiment, the identifier 220 provided at 302 may be data signed with the public key 210 of the individual 102.

At 304, the entity computing system 106 receives the public key 210 and/or the identifier 220. At 306, the entity computing system 106 cross-references the received public key 210 and/or the identifier 220 with the block chain 115 to retrieve the individual's virtual passport 214 from the block chain 115. The virtual passport 214 stored in the block chain 215 may have been signed with the private key 212.

At 308, the entity computing system 106 verifies the authenticity of the virtual passport 214 using the public key 210. For example, digital signature algorithms may be utilized using the public key 210 to verify that the virtual passport 214 was in fact signed with the private key 212 by the identity verification computing system 104. At 310, the entity computing system 106 determines whether the digital signature of the virtual passport is authentic based on the verification performed at step 308. If the answer to step 310 is "NO," at 312, the identity of the individual 102 is not verified. If the answer to step 310 is "YES," the method 300 continues to step 314.

At 314, the entity computing system 106 determines whether the virtual passport 214 matches the individual 102. For example, the virtual passport 214 may include a picture and/or other identifying information about the individual 102. The verification may be visual, such as a cashier verifying that the picture of the individual 102 included in the virtual passport 214 matches the individual's appearance. The verification may also be computational, such as verifying that the individual's fingerprint matches a fingerprint stored in the virtual passport 214. If the answer to step 314 is "NO," at 312, the identity of the individual 102 is not verified. If the answer to step 314 is "YES," at 316, the identity of the individual 102 is verified.

Figure 3B:
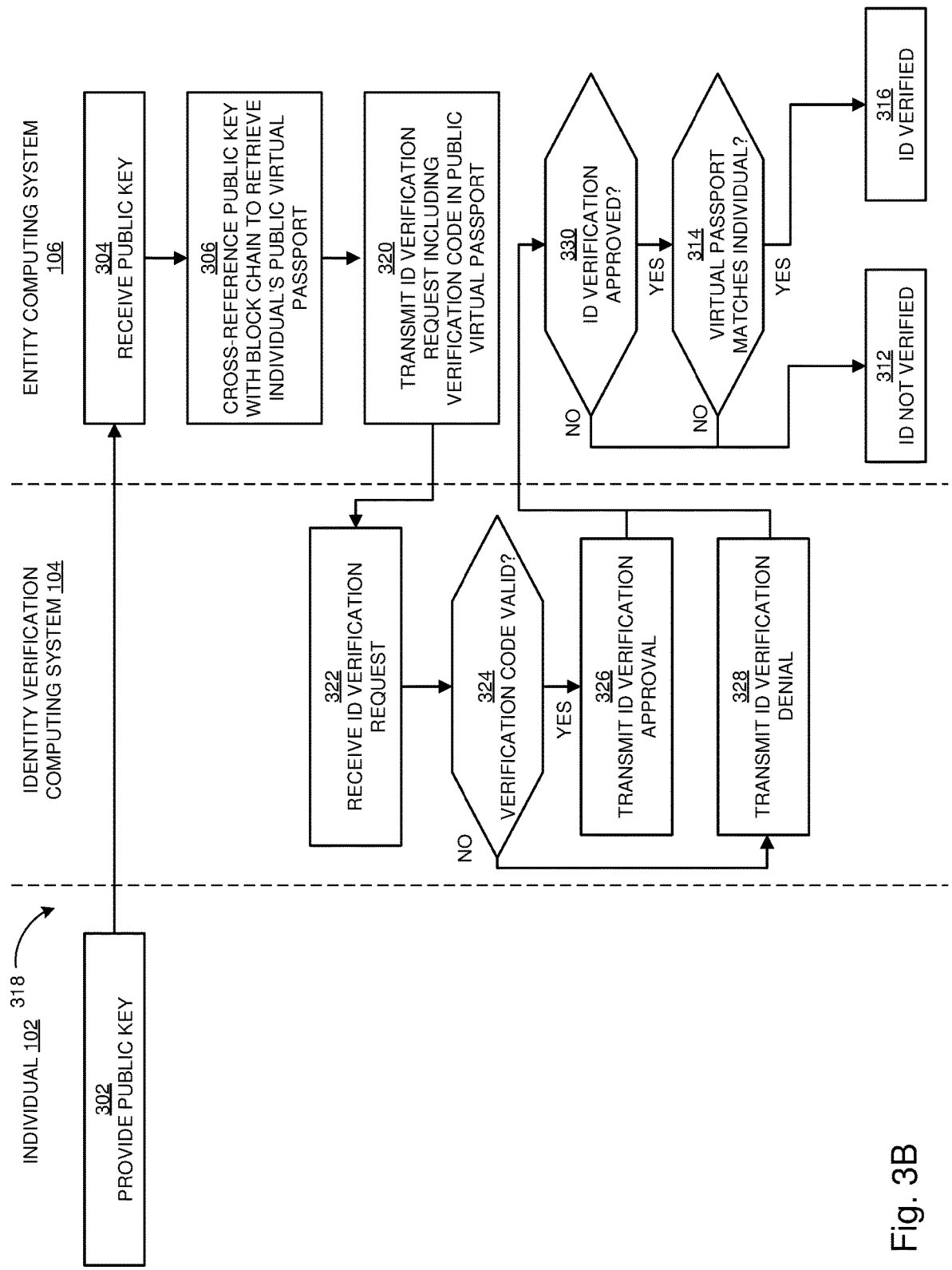

FIG. 3B is a flow diagram of a method 318 of verifying the identity of an individual using a virtual passport of the individual, according to another embodiment. Steps 302-306 and steps 312-316 may generally be the same as or similar to those described above in connection with the method 300 of FIG. 3A. However, the method 318 of FIG. 3B includes additional steps relating to operative communication between the entity computing system 106 and the identity verification computing system 104 to provide a further layer of identity verification.

At 320, upon retrieving the individual's virtual passport 214 from the block chain 115, the entity computing system 106 generates an identity verification request to verify the identity of the individual 102, and transmits the identity verification request to the identity verification computing system 104. The identity verification request includes the verification code 218 included in the individual's virtual passport 214. As described above, the verification code 218 was generated by the identity verification computing system 104 in connection with creating the individual's virtual passport 214. In some embodiments, the identity verification request includes the entire virtual passport 214, which includes the verification code 218.

At 322, the identity verification computing system 104 receives the identity verification request. At 324, the identity verification computing system 104 determines whether the verification code 218 is valid. More specifically, the identity verification computing system 104 determines if the verification code 218 matches the verification code 218 that was generated by the identity verification computing system 104 in connection with creating the individual's virtual passport 214. For example, the identity verification computing system 104 may have saved a copy of the verification code 218 in the secure identity database 110, and may determine whether the verification code 218 received with the identity verification request matches the stored verification code 218 associated with the individual's virtual passport 214.

If the answer to step 324 is "YES," at 326, an identification verification approval is transmitted to the entity computing system 106. If the answer to step 324 is "NO," at 328, an identification verification denial is transmitted to the entity computing system 106. At 330, the entity computing system 106 receives the identification verification approval or denial and determines if the identity verification has been approved or denied. If the answer to step 330 is "NO," at 312, the identity of the individual 102 is not verified. If the answer to step 330 is "YES," the method 300 continues to step 314.

At 314, the entity computing system 106 determines whether the virtual passport 214 matches the individual 102, as described above in connection with FIG. 2. If the answer to step 314 is "NO," at 312, the identity of the individual 102 is not verified. If the answer to step 314 is "YES," at 316, the identity of the individual 102 is verified.

Figure 3C:
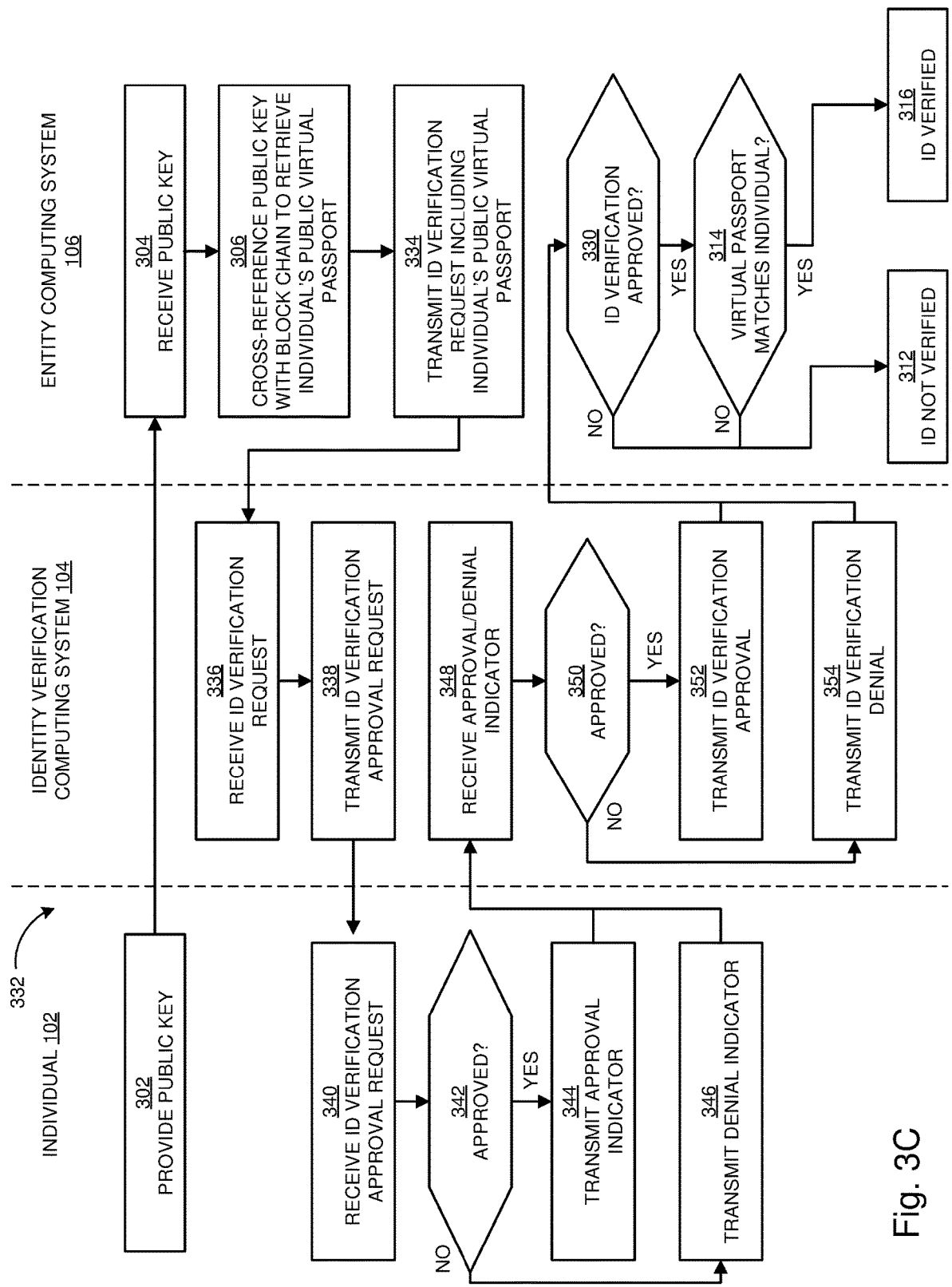

FIG. 3C is a flow diagram of a method 332 of verifying the identity of an individual using a virtual passport of the individual, according to another embodiment. Steps 302-306 and steps 312-316 may generally be the same as or similar to those described above in connection with the method 300 of FIG. 3A. However, the method 332 of FIG. 3C includes additional steps relating to requesting approval from the individual 102 to verify the individual's identity. It should be understood that, according to various embodiments, some or all of the steps shown in each of FIGS. 3A-3C may be utilized to verify the identities of individuals.

At 334, upon retrieving the individual's virtual passport 214 from the block chain 115, the entity computing system 106 generates an identity verification request to verify the identity of the individual 102, and transmits the identity verification request to the identity verification computing system 104. At 336, the identity verification computing system 104 receives the identity verification request. The identity verification request may include the individual's virtual passport 214.

At 338, the identity verification computing system 104 generates an identity verification approval request, and transmits the identity verification approval request to the individual 102. The purpose of the identity verification approval request is to inform the individual 102 that another party is requesting verification of the individual's identity, and to require approval from the individual 102 before attempting to verify the individual's identity. Accordingly, the identity verification approval request provides an additional layer of security and accuracy in identity verification. The identity verification computing system 104 may determine the particular individual 102 to contact based on the individual's virtual passport 214 included in the identity verification request.

At 340, the individual 102 receives the identity verification approval request. The identity verification approval request indicates that the entity computing system 106 has requested to verify the identity of the individual 102. The identity verification approval request may be transmitted to the mobile device of the individual 102 (e.g., via text message or push notification), via the POS system 120 of the entity computing system 106, or in other ways.

At 342, the individual 102 approves or denies the identity verification approval request. The individual 102 is aware of whether or not the entity computing system 106 is expected to be requesting verification of the individual's identity. For example, the individual 102 may have, moments earlier, provided his or her virtual passport 214 or identifier 220 to the entity computing system 106 to verify the individual's identity. Accordingly, the individual 102 would likely approve the identity verification approval request associated with the entity computing system 106. In another situation, the identity verification approval request may indicate that that another entity is unexpectedly requesting verification of the individual's identity. In this situation, the individual 102 may deny the identity verification approval request, because the request may be fraudulent.

If the answer to step 342 is "YES," at 344, an approval indicator is transmitted from the individual 102 (e.g., from the individual's mobile device) to the identity verification computing system 104. If the answer to step 342 is "NO," at 346, a denial indicator is transmitted from the individual 102 (e.g., from the individual's mobile device) to the identity verification computing system 104. The approval indicator may be a simple binary response (e.g., "YES" or "NO"), or may include other information. For example, in one embodiment, the approval indicator includes a biometric of the individual 102, a password or PIN, etc. In another embodiment, the approval indicator includes the individual's virtual passport 214. In a further embodiment, the approval indicator includes or is signed with the individual's public key 210.

At 348, the identity verification computing system 104 receives the approval or denial indicator from the individual 102. At 350, the identity verification computing system 104 determines, based on the received approval or denial indicator, whether the individual 102 has approved the identity verification approval request. If the answer to step 350 is "YES," at 352, an identity verification approval is transmitted from the identity verification computing system 104 to the entity computing system 106. If the answer to step 350 is "NO," at 354, an identity verification denial is transmitted from the identity verification computing system 104 to the entity computing system 106.

At 356, the entity computing system 106 receives the identification verification approval or denial and determines if the identity verification has been approved or denied. If the answer to step 356 is "NO," at 312, the identity of the individual 102 is not verified. If the answer to step 356 is "YES," the method 300 continues to step 314. At 314, the entity computing system 106 determines whether the virtual passport 214 matches the individual 102, as described above in connection with FIG. 2. If the answer to step 314 is "NO," at 312, the identity of the individual 102 is not verified. If the answer to step 314 is "YES," at 316, the identity of the individual 102 is verified.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method performed by an identity verification computing system, the method comprising:
    creating a virtual passport for an individual, the virtual passport uniquely identifying the individual, the virtual passport comprising a first unique identifier generated for the individual and a first verification code, a copy of the first verification code being stored relationally to the first unique identifier;
    providing, by the identity verification computing system, a public/private key pair for the individual;

signing the virtual passport with a private key of the public/private key pair;
entering a signed virtual passport in a public block chain, the signed virtual passport being retrievable from the public block chain;
receiving, from an entity computing system, an identity verification request comprising a second unique identifier and a second verification code retrieved from the signed virtual passport stored in the public block chain using a public key of the public/private key pair;
based on a match between the second unique identifier and the first unique identifier, retrieving the copy of the first verification code stored relationally to the first unique identifier;
determining whether the second verification code matches the copy of the first verification code;
when the second verification code matches the copy of the first verification code, transmitting an identity verification approval message to the entity computing system; and
when the second verification code does not match the copy of the first verification code, transmitting an identity verification denial message to the entity computing system;
authenticity of the signed virtual passport being determined via the public key of the public/private key pair, the second unique identifier and the first verification code by, responsive to the identity verification request inclusive of the second verification code retrieved from the signed virtual passport stored in the public block chain using the public key of the public/private key pair, comparing the second verification code to the copy of the first verification code to ensure the match.

2. The method of claim 1, further comprising:
transmitting, to a computing device of the individual, an identity verification approval request, the identity verification approval request identifying the entity computing system;
receiving, from the computing device in response to the identity verification approval request, an identity verification approval indicator; and
transmitting the identity verification approval indicator to the entity computing system.

3. The method of claim 2, the identity verification approval indicator received from the computing device further comprising at least one of a password and a biometric.

4. The method of claim 1, the signed virtual passport being indexed in the public block chain via the public key.

5. The method of claim 1, the signed virtual passport being indexed in the public block chain via the first unique identifier.

6. The method of claim 1, the identity verification computing system being a financial institution at which the individual holds a financial account, and the virtual passport being created using customer identification data associated with the individual's financial account.

7. The method of claim 1, storing a public virtual passport entry in the block chain comprising producing a valid proof of work.

8. The method of claim 1, further comprising recording a result of the identity verification request to the public block chain.

9. The method of claim 1, further comprising encrypting identifying information of the individual included in the virtual passport prior to entering the signed virtual passport in the public block chain.

10. A system comprising a processor and instructions stored in non-transitory machine-readable media, the instructions configured to cause the system to:
create a virtual passport for an individual, the virtual passport uniquely identifying the individual, the virtual passport comprising a first unique identifier generated for the individual and a first verification code, a copy of the first verification code being stored relationally to the first unique identifier;
provide a public/private key pair for the individual;
sign the virtual passport with a private key of the public/private key pair;
enter a signed virtual passport in a public block chain, the signed virtual passport being retrievable from the public block chain;
receive, from an entity computing system, an identity verification request comprising a second unique identifier and a second verification code retrieved from the signed virtual passport stored in the public block chain using a public key of the public/private key pair;
based on a match between the second unique identifier and the first unique identifier, retrieve the copy of the first verification code stored relationally to the first unique identifier;
determine whether the second verification code matches the copy of the first verification code;
when the second verification code matches the copy of the first verification code, transmit an identity verification approval message to the entity computing system; and
when the second verification code does not match the copy of the first verification code, transmit an identity verification denial message to the entity computing system;
authenticity of the signed virtual passport being determined via the public key of the public/private key pair, the second unique identifier and the first verification code, by, responsive to the identity verification request inclusive of the second verification code retrieved from the signed virtual passport stored in the public block chain using the public key of the public/private key pair, comparing the second verification code to the copy of the first verification code to ensure the match.

11. The system of claim 10, wherein the instructions are further configured to cause the system to:
transmit, to a computing device of the individual, an identity verification approval request, the identity verification approval request identifying the entity computing system;
receive, from the computing device in response to the identity verification approval request, an identity verification approval indicator; and
transmit the identity verification approval indicator to the entity computing system.

12. The system of claim 11, the identity verification approval indicator received from the computing device further comprising at least one of a password and a biometric provided by the individual.

13. The system of claim 10, the signed virtual passport being indexed in the public block chain via the public key.

14. The system of claim 10, the signed virtual passport being indexed in the public block chain via the first unique identifier.

15. The system of claim 10, the system being associated with a financial institution at which the individual holds a financial account, and the virtual passport being created using customer identification data associated with the individual's financial account.

16. The system of claim 10, storing a public virtual passport entry in the block chain comprising producing a valid proof of work.

17. The system of claim 10, the instructions being further configured to record a result of the identity verification request to the public block chain.

18. An identity verification computing system, comprising:
- a network interface;
- a secure identity database;
- a memory; and
- at least one processor configured to:
  - create a virtual passport for an individual, the virtual passport uniquely identifying the individual, the virtual passport comprising a first unique identifier generated for the individual and a first verification code, a copy of the first verification code being stored in the secure identity database relationally to the first unique identifier;
  - sign the virtual passport with a private key of a public/private key pair;
  - enter a signed virtual passport in a public block chain, wherein the signed virtual passport is retrievable from the public block chain;
  - receive, from an entity computing system, an identity verification request comprising a second unique identifier and a second verification code retrieved from the signed virtual passport stored in the public block chain using a public key of the public/private key pair;
  - based on a match between the second unique identifier and the first unique identifier, retrieve the copy of the first verification code stored relationally to the first unique identifier;
  - determine whether the second verification code matches the copy of the first verification code;
  - when the second verification code matches the copy of the first verification code, transmit an identity verification approval message to the entity computing system; and
  - when the second verification code does not match the copy of the first verification code, transmit an identity verification denial message to the entity computing system;
  - authenticity of the signed virtual passport being determined via the public key of the public/private key pair, the second unique identifier and the first verification code by, responsive to the identity verification request inclusive of the second verification code retrieved from the signed virtual passport stored in the public block chain using the public key of the public/private key pair, comparing the second verification code to the copy of the first verification code to ensure the match.

19. The system of claim 18, wherein the processor is further configured to:
- transmit, to a computing device of the individual, an identity verification approval request, the identity verification approval request identifying the entity computing system;
- receive, from the computing device in response to the identity verification approval request, an identity verification approval indicator; and
- transmit the identity verification approval indicator to the entity computing system.

20. The system of claim 19, the identity verification approval indicator received from the computing device further comprising at least one of a password and a biometric provided by the individual.

21. The system of claim 18, the signed virtual passport being indexed in the public block chain via the public key.

22. The system of claim 18, the signed virtual passport being indexed in the public block chain via the first unique identifier.

23. The system of claim 18, the system being a financial institution at which the individual holds a financial account, and the virtual passport being created using customer identification data associated with the individual's financial account.

24. The system of claim 18, storing a public virtual passport entry in the block chain comprising producing a valid proof of work.

25. The system of claim 18, the processor being further configured to record a result of the identity verification request to the public block chain.

26. A computer-implemented method performed by an entity computing system, the method comprising:
- receiving a public key from a computing system associated with an individual, the public key being part of a public/private key pair provided by an identity verification computing system in connection with creating a virtual passport for the individual, the virtual passport comprising identifying information, a unique identifier generated for the individual and a first verification code generated as part of creating the virtual passport and included in the virtual passport, a copy of the first verification code being stored in a secure identity database of the identity verification computing system relationally to the unique identifier;
- creating the virtual passport, comprising:
  - generating, by an identity verification circuit of the identity verification computing system, the public/private key pair,
  - storing, by the identity verification circuit of the identity verification computing system, a private key of the public/private key pair in the secure identity database of the identity verification computing system,
  - transmitting, by the identity verification circuit of the identity verification computing system, the public key of the public/private key pair to a computing device of the individual, and
  - signing the virtual passport with the private key retrieved from the secure identity database;
- retrieving the virtual passport from a public block chain via the public key, the virtual passport having been signed by the private key of the public/private key pair; and
- verifying authenticity of a signed virtual passport using the unique identifier and the first verification code, comprising:
  - transmitting, to the identity verification computing system, an identity verification request comprising the unique identifier and a second verification code received from the individual; and
  - receiving, from the identity verification computing system, an identity verification approval message generated in response to determining that the first verification code matches the second verification code.

27. The method of claim 26, further comprising:
- receiving, from the identity verification computing system, an identity verification approval indicator, the identity verification approval indicator transmitted in response to the identity verification computing system receiving identity verification approval from the computing device of the individual.

28. The method of claim 27, the identity verification approval indicator being received from the computing device of the individual further includes at least one of a password and a biometric provided by the individual.

* * * * *